March 13, 1928.
J. L. DELPINI
1,662,376
TRANSPORTING VEHICLE
Filed July 23, 1924
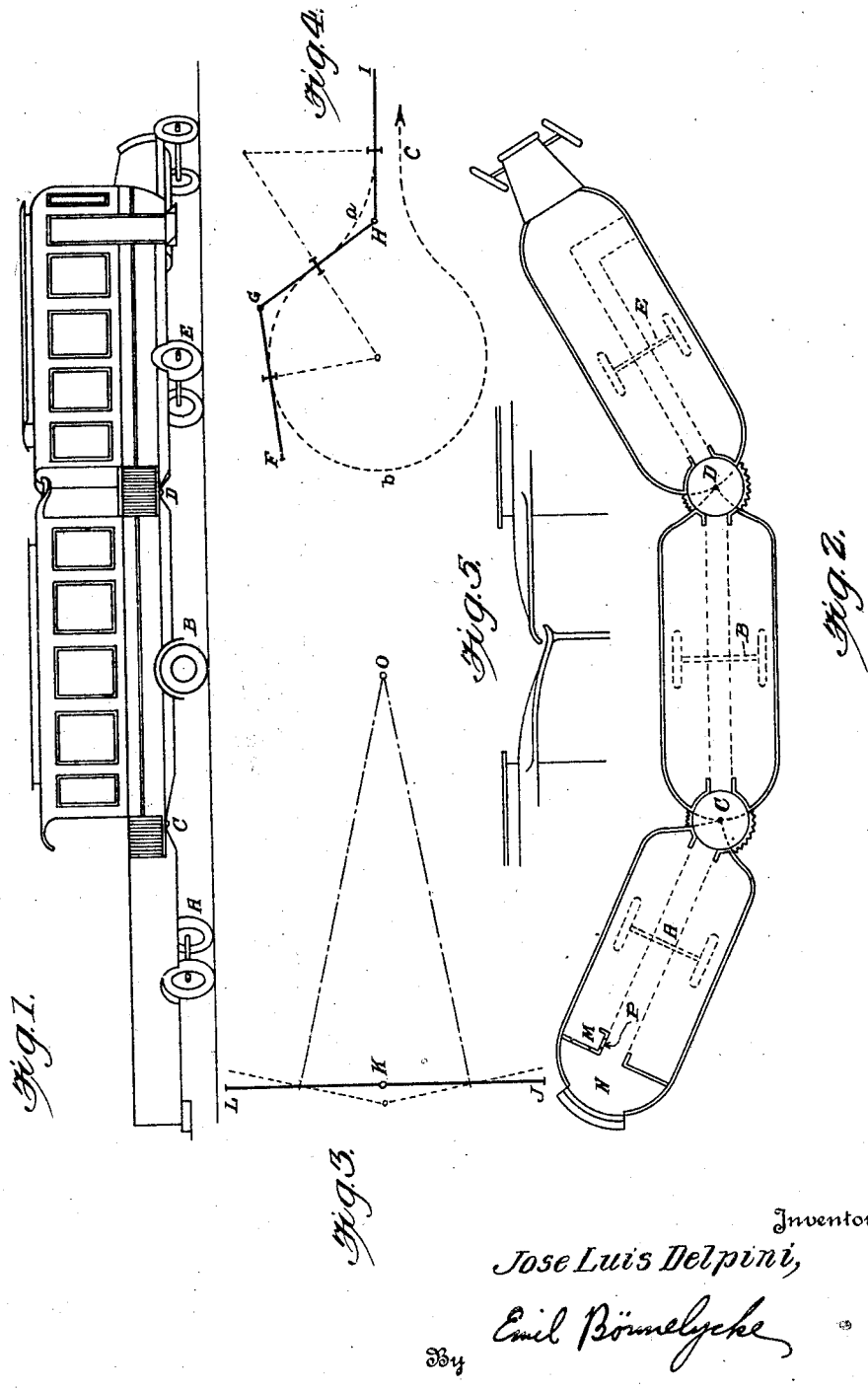
Inventor
Jose Luis Delpini,
By Emil Bönnelycke
Attorney Patented Mar. 13, 1928.

1,662,376

UNITED STATES PATENT OFFICE.

JOSÉ LUIS DELPINI, OF BUENOS AIRES, ARGENTINA.

TRANSPORTING VEHICLE.

Application filed July 23, 1924, Serial No. 727,796, and in Argentina December 23, 1923.

My present invention relates to a new type of vehicle for the transportation of loads or passengers its main object being to provide a very simple and economical vehicle which is formed by two or more articulated units.

My invention has further objects in view which will be clearly understood from the following description.

In order that my present invention be clearly understood and easily carried into practice a preferred embodiment thereof has been shown in the appended drawings wherein.

Figure 1 is a perspective elevational view of a three unit vehicle according to my present invention.

Figure 2 is a plan view thereof.

Figures 3 and 4 are diagrams showing the adaptability of the vehicle's units to turning and Figure 5 is a detail showing the interconnection of the roofs of the units.

Similar characters of reference denote same or like parts throughout the said figures.

In the embodiment shown which is a vehicle for passengers, the vehicle consists of a series of units or car bodies suitably articulated at several points by means of universal joints of any convenient type as shown in C and D. Each of the said units rests upon a pair of wheels and the universal joint which precedes it. It is obvious that under such conditions the vehicle, independent from the number of units which constitute it, will have a perfect adaptability to the unevenesses of the ground, as the universal joint permits all three grades of liberty to each unit with respect to the other in the cinematic chain thus formed. A perfect smoothness of progress is so obtained. See Figures 1 and 2.

The length of the articulated vehicle is no hindrance to its perfect turning in closed curves. If each articulation is placed equidistant from both adjacent axles it is obtained at each unit of a vehicle entering a curve will force the subsequent unit to take the same curve and upon the same center. So, for instance (see Figure 3) if the unit JK experiences a deviation in respect of the straight line of progress, it is obvious that the next unit will be subject to a like and concording deviation so that both units will be tangential to the same arc of circle. On another hand, if a complete turn is to be effected, it is well known that a vehicle having any considerable length will be compelled to follow the curve as shown in a, b, c, (Figure 4). It is obvious that the articulated vehicle according to my present invention will instantly and automatically adapt itself even to such curves so clearly shown in the diagram of Figure 4.

In the case of passenger transportation my vehicle shows the considerable advantage that a single conductor may attend to the operation of the vehicle.

The vehicle above described will be very lasting as the body of the car and chassis thereof will not experience any shrinking action as they always rest upon three points.

Furthermore, should the conditions of the road require it, it will be possible to increase or decrease the adhesive power of the motive wheels by simply receding or advancing the axle of each unit or articulation thereof (axles A and B in Figure 1) which may be directly done by the driver or motorman from the controls. It is obvious that in such cases, the axle must be slidably mounted.

The slight relative vertical movements between the units allow a perfect covering of the passage between the different units. To that end as clearly shown in Figures 1 and 5 it is sufficient to extend the cover of each unit until it comes to be under the extended cover of the adjacent foregoing unit. The extended cover will be provided with a collecting channel for the water of both adjacent covers, said water being then led through suitable channels to the ground as shown in Figure 5.

In the case of a passenger vehicle a single ticket box M may be used for the sale of tickets and collection of passes, said box with the corresponding window P being in front of a platform N through which all passengers must pass on their way to the inside of the vehicle.

The number of units of each car may be easily changed at will and the fore unit is not simply a tractor but a motor truck which can be used by itself for the transportation of passengers or loads.

It is obvious that many constructional and other changes may be introduced without departing from the scope of my present invention which has been clearly set forth in the appended claims.

Having now fully described and ascer- tained the nature of my present invention and in what manner the same is to be carried into practice, I declare that what I claim and desire to protect by Letters Patent is:—

1. A vehicle comprising a car having two sets of wheels; a plurality of trailers each having a single set of wheels; universal joints for connecting the trailers to each other and to the car; a passage provided for the entire train of trailers and the car so that they shall be inter-communicating; and means provided for displacing the bodies of the trailers relative to its set of wheels in order to change the distribution of the load and the adhesive power.

2. A vehicle comprising a car having two sets of wheels; a plurality of trailers each having a single set of wheels; universal joints for connecting the trailers to each other and to the car; a passage provided for the entire train of trailers and the car so that they shall be inter-communicating; means provided for displacing the bodies of the trailers relative to its set of wheels in order to change the distribution of the load and the adhesive power; and a superposed roof provided over each universal joint.

In testimony whereof I affix my signature.

JOSÉ LUIS DELPINI.